United States Patent [19]

Brewer et al.

[11] Patent Number: 5,108,353
[45] Date of Patent: Apr. 28, 1992

[54] CROSSED-AXIS GEAR DIFFERENTIAL

[75] Inventors: Mark S. Brewer, North Chili; James S. Dye, Walworth, both of N.Y.

[73] Assignee: Zexel-Gleason U.S.A., Inc., Rochester, N.Y.

[21] Appl. No.: 690,491

[22] Filed: Apr. 24, 1991

[51] Int. Cl.⁵ .............................................. F16H 1/42
[52] U.S. Cl. .................................. 475/227; 475/251; 475/252
[58] Field of Search ....................... 475/227, 251, 252

[56] References Cited

U.S. PATENT DOCUMENTS

| | | |
|---|---|---|
| 1,195,314 | 8/1916 | Williams . |
| 1,297,954 | 3/1919 | Williams ............................. 475/252 X |
| 1,365,756 | 1/1921 | Williams ............................. 475/227 |
| 1,941,645 | 1/1934 | Walter . |
| 2,139,906 | 12/1938 | Molly ............................. 475/251 X |
| 2,631,475 | 3/1953 | Gleasman . |
| 2,823,559 | 2/1958 | Ransom . |
| 2,859,641 | 11/1958 | Gleasman . |
| 2,898,778 | 8/1959 | Ransom . |
| 2,900,846 | 8/1959 | Lehman . |
| 3,735,647 | 5/1973 | Glaseman . |
| 3,875,824 | 4/1975 | Benjamin . |
| 4,805,487 | 2/1989 | Pedersen . |
| 4,878,400 | 11/1989 | Kimura et al. ............................. 475/227 |
| 4,890,511 | 1/1990 | Pedersen . |
| 4,926,711 | 5/1990 | Arakawa . |
| 4,926,712 | 5/1990 | Stritzel ............................. 475/227 |

Primary Examiner—Dwight Diehl
Attorney, Agent, or Firm—Eugene Stephens & Associates

[57] ABSTRACT

A gear differential includes planetary gear sets made up of two side gears (26, 28) mounted for rotation about a common axis (24) and pairs of element gears (36, 38) mounted for rotation about respective parallel axes (48, 50) that are both offset and inclined through acute shaft angles ($L_1$, $L_2$) with respect to the common side gear axis (24). The two element gears (36, 38) have first gear portions (52, 54) that mesh with respective side gears (26, 28) and second gear portions (56, 58) that mesh with each other. The side gears (26, 28) have respective helix angles ($A_1$, $A_2$) that are substantially equal in absolute magnitude but opposite in hand. However, lead angles of the side gears (26, 28), as the complements of their respective helix angles ($A_1$, $A_2$), are larger than the shaft angles to provide opposite directions of relative rotation between the side gears.

21 Claims, 6 Drawing Sheets

CROSSED-AXIS GEAR DIFFERENTIAL

TECHNICAL FIELD

The invention relates to the field of automotive differentials having planetary gear arrangements carried within housings that are rotatable about a pair of drive shafts interconnected by the planetary gear arrangements.

BACKGROUND OF INVENTION

Gear differentials generally include compound planetary gear sets interconnecting a pair of drive shafts for opposite directions of rotation with respect to a differential housing. So-called "side" or "end" gears, which form sun gear members of the compound planetary gear sets, are rotatively coupled to inner ends of the two drive shafts. The sun gears are interconnected for the opposite directions of rotation by so-called "element" or "spider" gears, which form the planet gear members of the sets. The planet gears are mounted for rotation about axes that may be variously offset and inclined with respect to a common axis of the sun gears and drive shafts.

In fact, the relative positions of the sun and planet gear axes in large part determine the kind of gearing that make up the planetary gear sets. For example, parallel axes are used for mounting spur or helical gears. Orthagonal axes are used for mounting either bevel or worm gears, depending upon the presence of any offset between the axes. Bevel gears are used when the sun and planet gear axes intersect, whereas worm gears are used when the gear axes do not intersect.

Although much less common, crossed-axis helical gears have also been used to form the compound planetary gear sets of gear differentials. Crossed-axis helical gears are mounted on axes that are offset from one another and inclined to one another at an acute angle.

Two examples of this type of differential are found in U.S. Pat. No. 1297954 (WILLIAMS). The side (sun) gears in both examples are interconnected by element (planet) gears mounted in pairs about parallel axes that are mutually inclined to a common axis of the side gears. One of the two examples includes side gears with teeth oriented to the same hand (sign) of helix angle; and in the other example, the two side gears have teeth with opposite hand helix angles. The absolute magnitudes of the opposite hand helix angles of the side gears are also different.

However, since the element gear members of each pair mesh with each other on parallel axes, the helix angles of the meshing element gears must be equal in absolute magnitude but opposite in hand (i.e., sum to zero degrees). If the absolute magnitude of the element gear helix angles is less than the shaft angle between the side and element gears, then the side gears are of the same hand, differing from one another in magnitude by twice the absolute magnitude of the element gear helix angles. In contrast, if the shaft angle is less than the absolute magnitude of the element gear helix angles, then the side gears are of opposite hand, differing from one another in absolute magnitude by twice the shaft angle.

These limitations pose special problems with torque distributions between the output shafts of crossed-axis planetary gear differentials. If the side gears are of the same hand helix angle or if the helix angles of the two side gears differ significantly in absolute magnitude, then, in response to the application of drive torque to the differential housing, the side gears generate a considerable thrust force against one end of the housing. The thrust force produces between one side gear and the housing frictional torque that encourages the transmission of torque from the differential housing to one of the drive shafts in response to one direction of relative rotation between the drive shafts (i.e., differentiation) and resists the transmission of housing torque to the same drive shaft in response to the opposite direction of differentiation. As a result, torque is distributed to the respective drive shafts in uneven proportions between the opposite directions of differentiation.

Both of the crossed-axis planetary gear examples of Williams have side gears with helix angles that are expected to generate considerable thrust against one end of the differential housing. The element gears in one of Williams' examples are spur gears. Accordingly, both side gears have helix angles equal to the shaft angle at which the element gear axes are inclined to the common axis of the side gears. The other of Williams' examples has element gears with opposite hand helix angles of an equal absolute magnitude that is greater than the shaft angle. Although the side gears are also of opposite hand, they differ in absolute magnitude by twice the shaft angle. Thus, both of Williams' examples have side gear helix angles that are expected to generate thrust forces that produce uneven torque distributions between the drive shafts compared during opposite directions of differentiation.

Crossed-axis helical gears are also known to have very limited load carrying capabilities. Both members of crossed-axis helical gear sets are conventional parallel axis gears (i.e., helical or spur gears) having cylindrical pitch surfaces. However, since the gear members are mounted on axes that are inclined to each other, the pitch surfaces of the gears have only point contact with each other. This greatly increases contact stresses on the gear teeth of crossed-axis helical gears in comparison with teeth of helical and spur gears mounted on parallel axis, which have line contact or more teeth in contact.

SUMMARY OF INVENTION

The invention overcomes problems of known crossed-axis gear differential designs by balancing side gear thrust forces between opposite ends of differential housings. For this purpose, the side gears are provided with respective gear teeth having opposite hand helix angles that are substantially equal in absolute magnitude. In other words, the two side gear helix angles sum to substantially zero degrees.

Element gears are mounted in pairs about axes that are preferably parallel to each other but are inclined to a common axis of the side gears through an acute angle. Each element gear has two gear portions. A first portion of the element gears includes teeth for meshing with one of the side gears, and a second portion of the element gears includes teeth for meshing with another element gear. The first element gear portions that mesh with respective side gears have teeth oriented to helix angles that can differ significantly in absolute magnitude. However, the second element gear portions that mesh with each other have helix angles that sum to substantially zero degrees.

The side and element gear pairs are mounted on axes that are inclined to each other at shaft angles less than the complement of the absolute magnitude of the side gear helix angles to provide for opposite directions of relative rotation between the side gears. In other words, the lead angles of the side gear teeth are larger than the shaft angles between the side and element gear axes so that opposite directions of relative rotation between intermeshing element gears produce opposite directions of rotation between the side gears.

When high torque biasing is required between drive shafts, the respective side gears and mating first gear portions of the element gears preferably form single enveloping worm gear sets. The side gears are made as helical gears having helix angles of substantially forty-five degrees or more. The first gear portions of the element gears are made as worm wheels that are conjugate to the mating side gears. For example, the worm wheel portions can be made by arranging a tool, together with its relative motions, to represent the mating helical side gear rolling through mesh with the worm wheel portions. As a result, the helical side gears and worm wheel portions of the element gears have mating tooth surfaces in line contact with each other, which significantly increases their load carrying capacities.

Since the side gears have helix angles of at least forty-five degrees, i.e., lead angles no greater than forty-five degrees, the side and element gear pairs are mounted on axes that are inclined to each other at shaft angles less than forty-five degrees. In addition, the second gear portions of the element gears are preferably spur gears to permit some adjustability in the mounting locations of the element gears along their axes. This enables the side and element gears to be adjusted to improve their contact characteristics without adversely affecting a timing relationship between the element gear pairs.

When lower biasing of torque between drive shafts is required, the side gear helix angles are preferably of opposite hand but less than forty-five degrees in absolute magnitude. Both the side gears and the first gear portions of the element gears are helical gears. Thus, the meshing conditions between the side and element gears are not sensitive to displacements of the respective gears along their axes. Accordingly, the second portions of the element gears can be made as helical gears to provide some adjustability in the timing relationship between various element gear pairs by relatively shifting the mating element gears along their axes. This technique can be used to better distribute torque loads between the element gear pairs.

Similar to the preceding embodiment, the side and element gears are preferably mounted at shaft angles less than forty-five degrees. This helps to minimize load concentrations and enables substantially the same housing to be used for a wide range of bias ratios that are balanced between opposite directions of differentiation.

DETAILED DESCRIPTION

Figure 1:
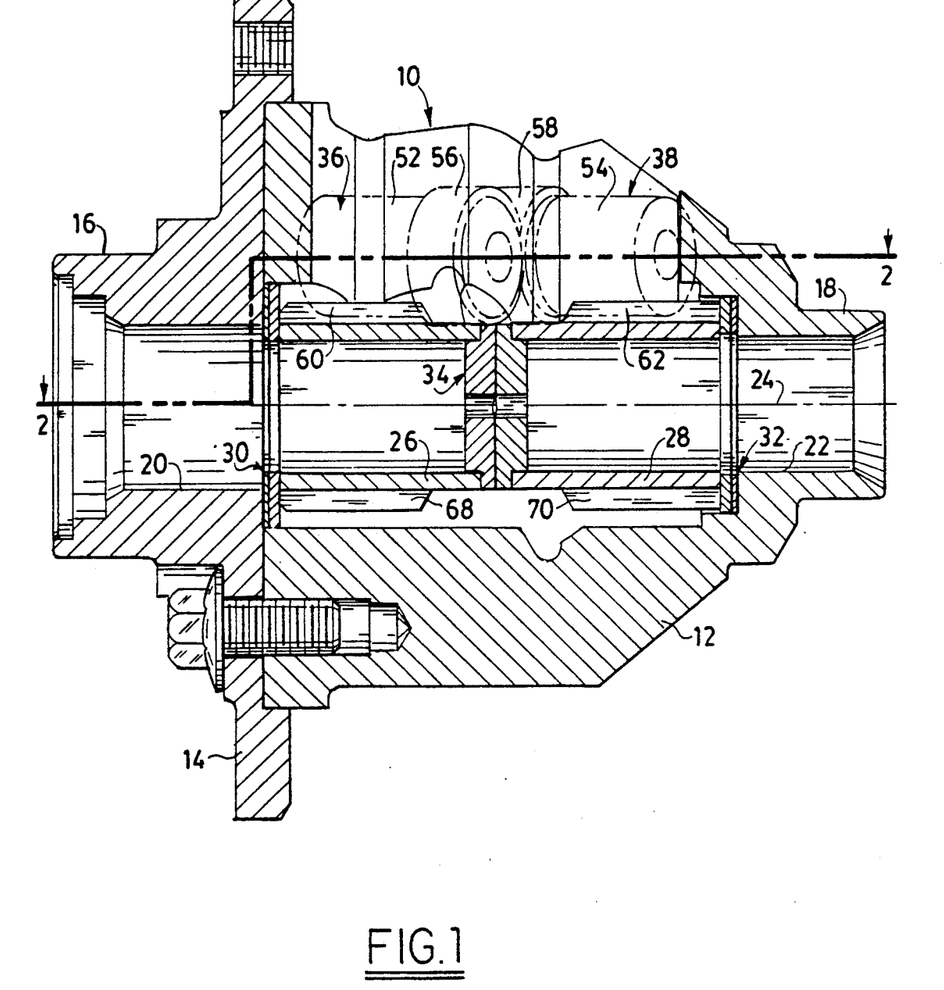
FIG. 1 is a partially cut away cross-sectional view of a differential housing exposing compound planetary gearing including a pair of element gears inclined at acute shaft angles to a pair of side gears.
Figure 2:
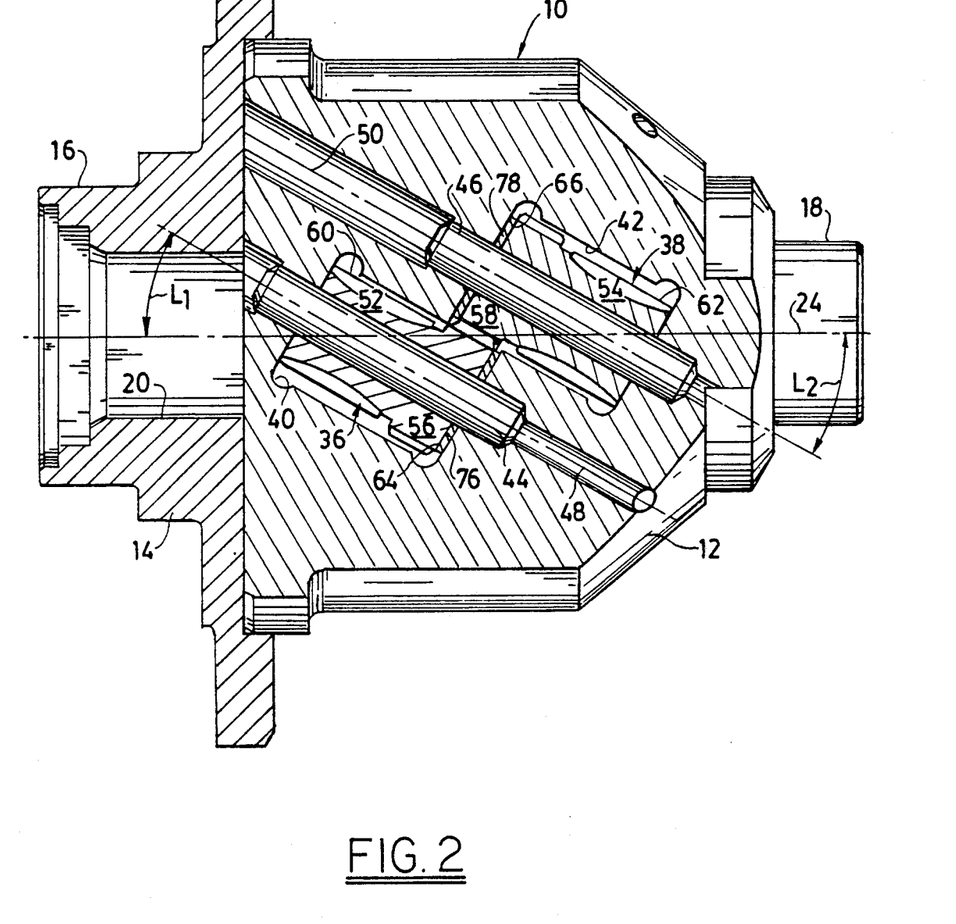
FIG. 2 is a different cross-sectional view through the differential housing along line 2—2 of FIG. 1 exposing the element gears in full view.

FIGS. 1 and 2 depict structural details of a differential housing 10 arranged in accordance with a preferred embodiment of our invention. The housing 10 is assembled from a main body portion 12 and a flange portion 14. Trunnions 16 and 18 are formed at opposite ends of the housing for receiving drive shafts (not shown) in respective bores 20 and 22 for rotation about a common axis 24.

A pair of side gears 26 and 28 are arranged within the housing for rotation with the respective drive shafts about the common axis 24. Opposite ends of the two side gears 26 and 28 are supported by washer packs 30 and 32 to help control friction between end faces of the side gears and the housing. Another washer pack 34 is located between the two side gears to help control friction between adjacent end faces of the side gears.

Element gears 36 and 38 are received within respective windows 40 and 42 formed in the main body portion 12. Journal pins 44 and 46 are mounted in bores also formed in the main body portion and provide for rotating the element gears about respective parallel axes 48 and 50. Since the two element gear axes 48 and 50 are parallel to each other, they are inclined with respect to the common axis 24 of the side gears through shaft angles "$L_1$" and "$L_2$" of the same magnitude. Although only one pair of element gears 36 and 38 is shown in the views of FIGS. 1 and 2, it is preferred that two other pairs of element gears are also used to interconnect the side gears at substantially even angular increments about the common axis 24.

The two element gears 36 and 38 are divided into respective first gear portions 52, 54 and respective second gear portions 56, 58. First gear portions 52 and 54 of the two element gears include respective gear teeth 60 and 62 that mesh with respective gear teeth 68 and 70 of the two side gears. Second gear portions 56 and 58 of the same element gears include respective teeth 64 and 66 that mesh with each other.

Figure 3:
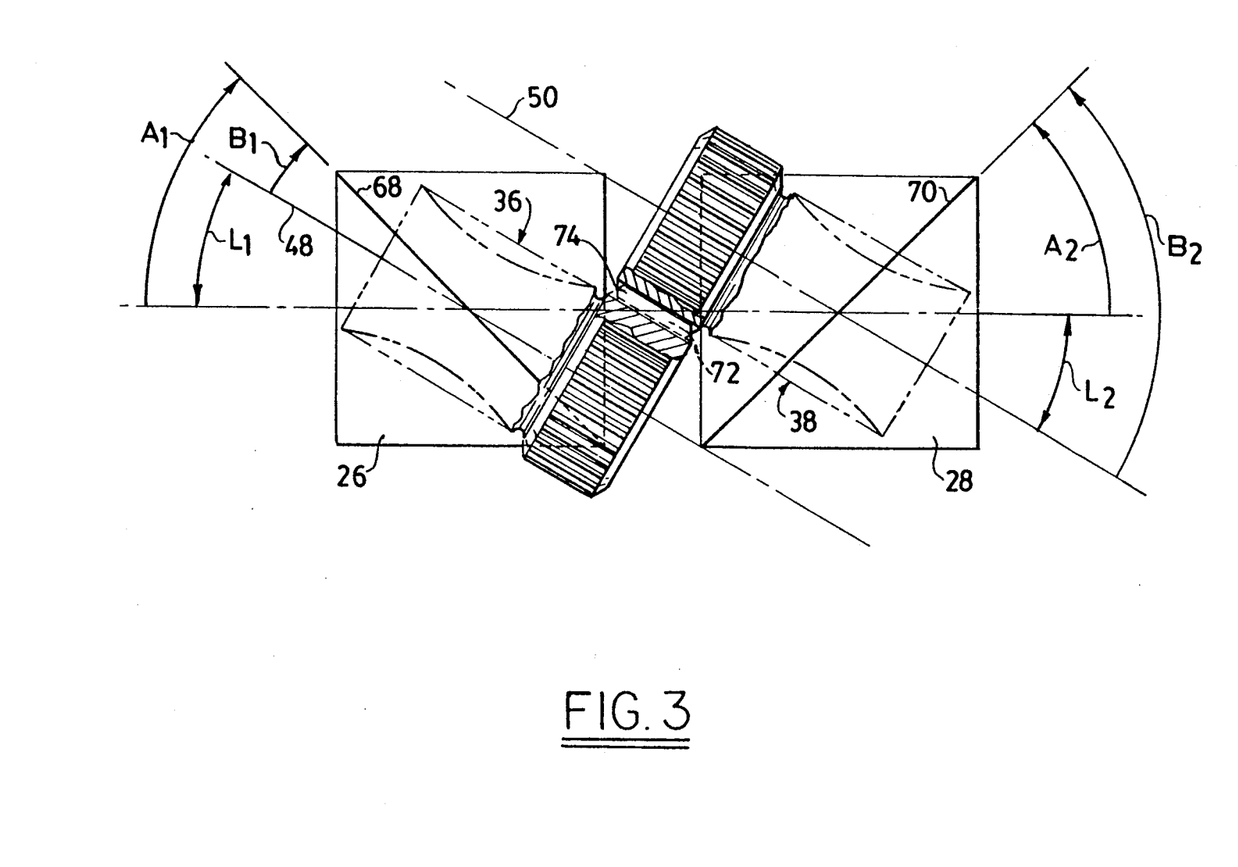
FIG. 3 is a schematic depiction of the compound planetary gearing showing various relationships between helix angles and shaft angles of the gearing.

The differential of FIGS. 1 and 2 is arranged to divide torque at high bias ratios (e.g., greater than 3 to 1) between drive shafts in resistance to differentiation. FIG. 3 schematically depicts orientations of the compound planetary gear axes and gear teeth that are primarily responsible for producing at gear mountings frictional reactions that are needed to support the high bias ratios.

The side gear teeth 68 and 70 are inclined to the common axis 24 through helix angles "$A_1$" and "$A_2$" that are equal in absolute magnitude but opposite in sign (i.e., hand). However, the gear teeth 60 and 62 of the first element gear portions have teeth oriented at opposite hand helix angles "$B_1$" and "$B_2$" that are not equal in absolute magnitude. In particular, the element gear helix angles $B_1$ and $B_2$ differ in absolute magnitude by the sum of the equal shaft angles $L_1$ and $L_2$.

Although the element gears 36 and 38 are mounted on parallel axes, the helix angles $B_1$ and $B_2$ of the first element gear portions 60 and 62 are allowed to differ in absolute magnitude because the second gear portions 56 and 58 of the same element gears are used to mesh with each other. The second gear portions 56 and 58 have respective spur gear teeth 72 and 74.

The side gear helix angles $A_1$ and $A_2$ of the teeth 68 and 70 are shown at approximately forty-five degrees of absolute magnitude but are preferably forty-five degrees or more. Accordingly, lead angles, which are the complement of the side gear helix angles, are equal to or less than forty-five degrees. The magnitudes of the shaft angles $L_1$ and $L_2$ are made less than the magnitudes of the side gear lead angles to preserve the opposite directions of rotation between the side gears 26 and 28.

The side gears 26 and 28 are made as conventional helical gears but form the worm members of single enveloping worm gear sets. The first element gear portions 52 and 54 are made as worm wheels conjugate to the side gears. For example, hobbing tools representing the side or worm gears can used to make the worm wheel portions. The side gear helix angles $A_1$ and $A_2$ at forty-five degrees or higher enable the hobs representing the side gears to exhibit adequate machining characteristics for generating the mating element gear portions 52 and 54 as worm wheels.

Although the single enveloping sets exhibit line contact between side gears and mating element gear portions, thereby increasing load carrying capacities, the meshing conditions of the sets are very sensitive to displacements in the mounting positions of the element gears 36 and 38 along their respective axes 48 and 50. Small displacements of the element gears can shift mating contact with the side gears to tooth ends and greatly reduce load capacities.

However, small axial displacements of the element gears do not adversely affect contact positions between the mating spur teeth 72 and 74 of the the second element gear portions. Accordingly, it is possible to adjust the mounting positions of the element gears 36 and 38 along their axes to optimize contact characteristics between the first gear portions 52 and 54 and the side gears 26 and 28 without adversely affecting contact characteristics between the second gear portions 56 and 58 of the same element gears. For example, washers 76 and 78 located at the ends of the element gears can be varied in thickness to adjust the positions of the element gears along their axes 48 and 50 to achieve optimum running positions between the first element gear portions 52 and 54 and the side gears 26 and 28, respectively.

Figure 4:
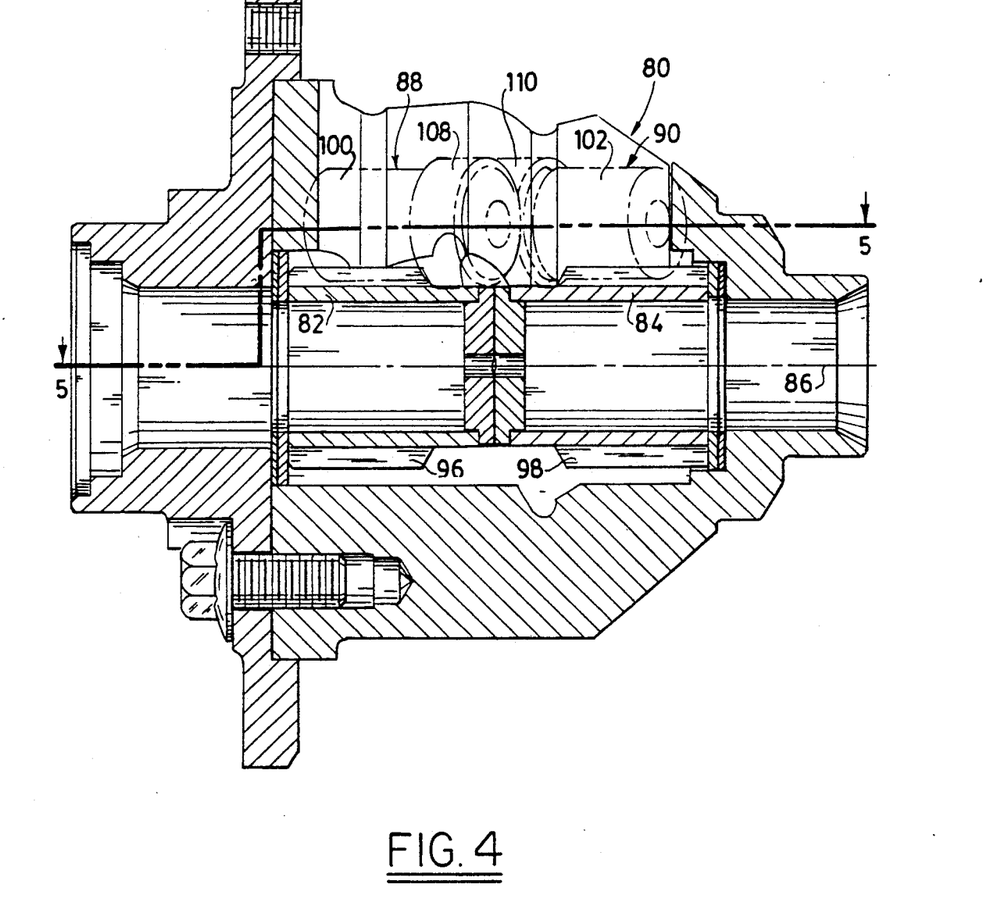
FIG. 4 is a view similar to FIG. 1 of another differential housing carrying compound planetary gearing with different gear tooth orientations.
Figure 5:
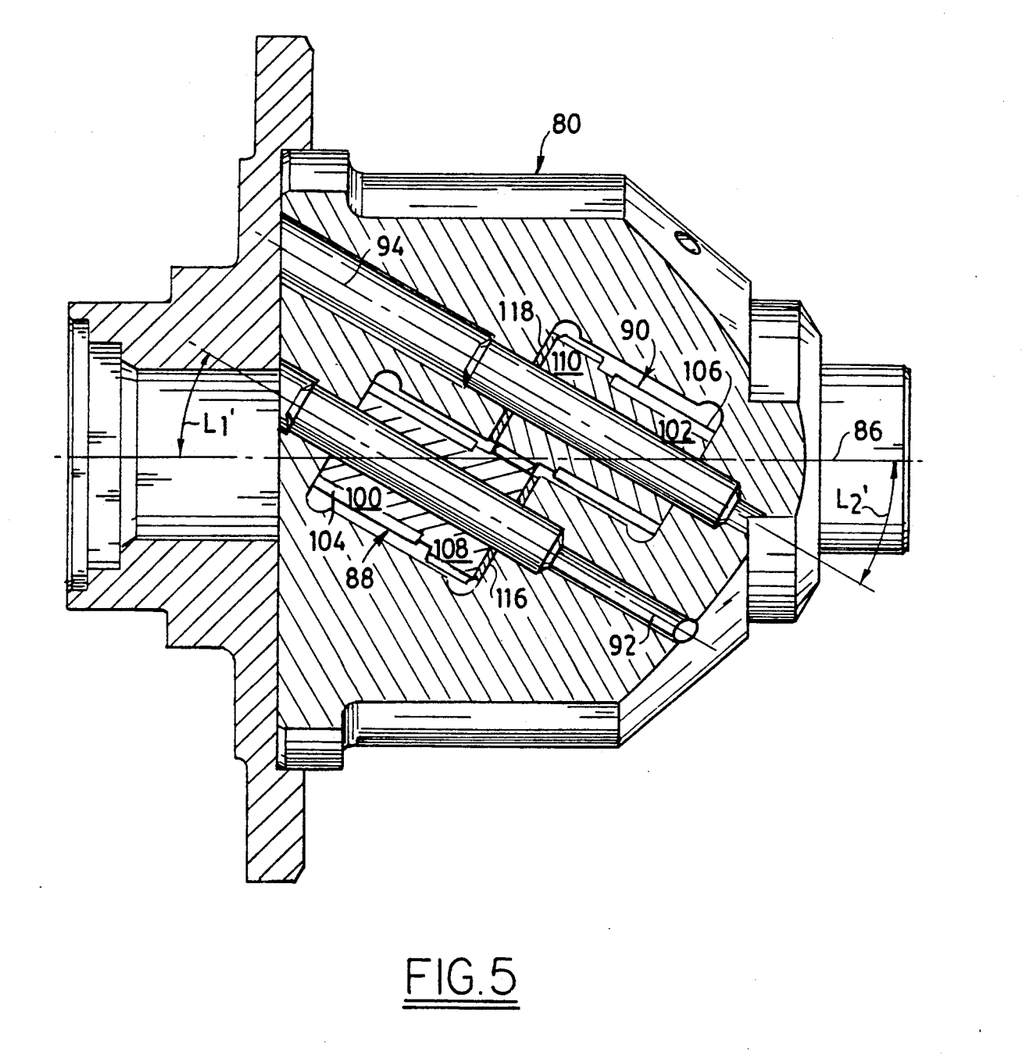
FIG. 5 is another view of the other differential housing cut along line 4—4 similar to the cut of FIG. 2.
Figure 6:
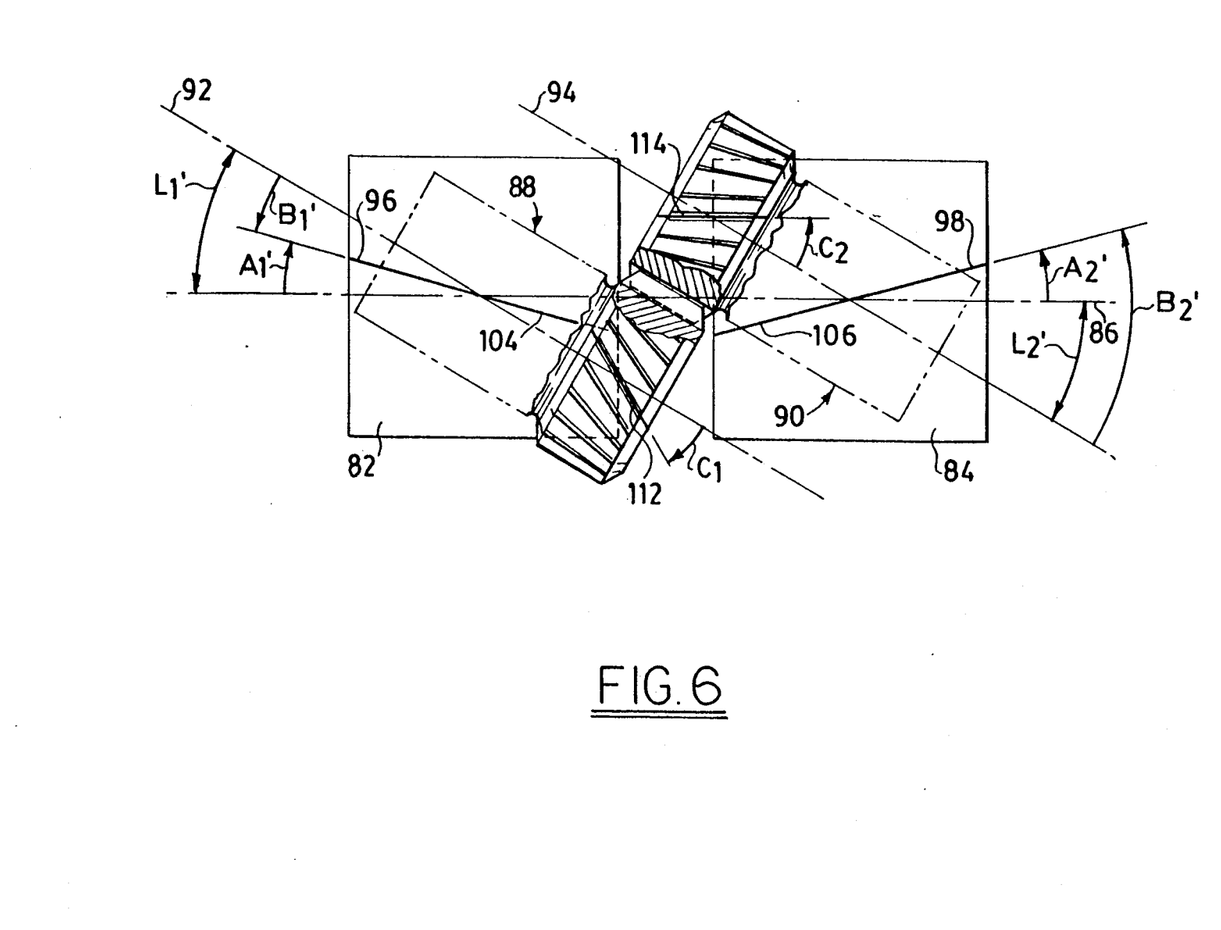
FIG. 6 is a schematic depiction of the planetary gearing of FIGS. 4 and 5 showing the different gear tooth orientations.

The remaining FIGS. 4 through 6 show substantially the same housing as the preceding figures, but the housing is used to carry different planetary gear sets for supporting lower bias ratios between drive shafts. For example, housing 80 is arranged to carry respective side gears 82 and 84 about a common axis of rotation 86. Element gears 88 and 90 are arranged for rotation about respective axes 92 and 94 that are parallel to each other and inclined to the common side gear axis 86 through equal acute shaft angles $L_1$ and $L_2$.

Also similar to the preceding embodiment, side gear teeth 96 and 98 are inclined to respective helix angles $A_1$ and $A_2$ that are substantially equal in absolute magnitude but opposite in sign. In addition, the element gears 88 and 90 have two portions. First element gear portions 100 and 102 have teeth 104 and 106 inclined to their respective axes 92 and 94 through helix angles $B_1$ and $B_2$ for meshing with the teeth 96 and 98 of the side gears. Second element gear portions include teeth 112 and 114 in mesh with each other.

However, the absolute magnitudes of the side gear helix angles $A_1$ and $A_2$ are much less than forty-five degrees. In fact, the depicted side gear helix angles are smaller than the shaft angles $L_1$ and $L_2$. This leaves element gear first portions 100 and 102 with respective teeth 104 and 106 oriented to the same hand of helix angle. The first element gear portions 100 and 102 are also made as helical gears and form, together with the two side gears 82 and 84, respective crossed-axis helical gear sets.

Although the load carrying capacity of individual crossed-axis helical gear sets is considerably less than for similarly sized conjugate gearing, contact characteristics between the members of crossed-axis helical gear sets are not sensitive to axial displacements of either member of the sets. The second element gear portions 108 and 110 are also made as helical gears that are not sensitive to axial displacements and have respective teeth 112 and 114 oriented to helix angles "$C_1$" and "$C_2$" that sum to zero degrees. However, relative axial displacement between the element gears 88 and 90 produces relative rotation between them in accordance with the helix angles of the mating second element gear portions 108 and 110. Such relative rotation can be used to adjust timing relationships between other pairs of element gears interconnecting the side gears to balance loads carried by different element gear pairs.

For example, washers 116 and 118 that are mounted at the end faces of the element gears 88 and 90 can be varied in thickness to adjust relative axial positions between the element gears. The adjustment in angular position produces relative rotation between the element gears that affects the timing of the element gear pair 88 and 90 with the other element gear pairs interconnecting the side gears 82 and 84. The thickness of at least one of the washers 116 and 118 is varied to help balance the loads carried by different element gear pairs.

We claim:

1. A gear differential having compound planetary gearing comprising:
   a differential housing that is rotatable about a pair of drive shafts;
   a pair of side gears that are arranged to be carried on respective ends of the drive shafts within said housing for rotation about a common axis;
   at least one pair of element gears that are mounted for rotation within said housing about respective axes inclined through acute shaft angles with respect to said common axis of the side gears; and
   each element gear having a first portion with teeth for meshing with teeth of one of said side gears and a second portion with teeth for meshing with teeth of another second element gear portion,
   wherein said pair of side gears have teeth oriented at helix angles that sum to substantially zero degrees.

2. The gear differential of claim 1 in which said acute shaft angles are less than a complement of said helix angles considered in absolute magnitude.

3. The gear differential of claim 2 in which said first portions of the element gears are formed substantially conjugate to said side gears with which said first portions are arranged to mesh.

4. The gear differential of claim 3 in which said side gear helix angles have absolute magnitudes of substantially forty-five degrees or more.

5. The gear differential of claim 4 in which said first portions of the element gears are worm wheels.

6. The gear differential of claim 5 in which said respective axes of the element gear pair are parallel to each other.

7. The gear differential of claim 6 in which said second portions of the element gears are spur gears.

8. The gear differential of claim 2 in which both said first portions of the element gears and said side gears are helical gears.

9. The gear differential of claim 8 in which said side gear teeth are oriented to helix angles having absolute magnitudes substantially less than forty-five degrees.

10. The gear differential of claim 8 including more than one of said pair of element gears having second portions formed as helical gears for adjusting a timing relationship between said element gear pairs.

11. The gear differential of claim 10 in which said element gears are adjustable along their respective axes by inserting washers of varying thicknesses between their end faces and said housing.

12. A differential having biasing characteristics for dividing torque between drive shafts in response to operating conditions encouraging relative rotation between drive shafts comprising:
    a differential housing that is rotatable about the drive shafts;
    a pair of side gears coupled to ends of the respective drive shafts for rotation about a common axis and having teeth oriented to respective helix angles that are of opposite hand; and
    a pair of element gears operatively connecting said side gears and having a first gear portion conjugate to one of said side gears and a second gear portion conjugate to another second element gear portion, wherein said element gears are mounted for rotation about respective axes of rotation that are inclined with respect to said common axis of the side gears through respective shaft angles that are less than a complement of said side gear helix angles considered in absolute magnitude.

13. The differential of claim 12 in which said first portion of the element gears is a worm wheel.

14. The differential of claim 13 in which said side gear helix angles have absolute magnitudes of substantially forty-five degrees or more.

15. The differential of claim 14 in which said shaft angles through which the element gear axes are inclined are substantially forty-five degrees or less.

16. The differential of claim 15 in which said side gear helix angles sum to substantially zero degrees.

17. A differential for use in an automotive drive line comprising:
    two planetary gear sets carried within a housing, each including a side gear rotatable about a common axis and element gears rotatable about axes inclined at a shaft angle to said common axis;
    said side gears each having tooth surfaces oriented at a lead angle that is greater in absolute magnitude than said shaft angle; and
    said element gears of each planetary gear set including first portions in mesh with said side gear of the same planetary gear set and second portions in mesh with second element gear portions of the other planetary gear set,
    wherein said second portions of the element gears are helical gears having teeth oriented to helix angles greater in absolute magnitude than zero degrees for adjusting a timing relationship between pairs of intermeshing element gears by relative movement between said element gears of the pairs along said axes of the element gears.

18. The differential of claim 17 in which said washers of varying thickness are mounted at end faces of said element gears to adjust the timing relationship between element gear pairs.

19. The differential of claim 17 in which both said side gears and said first portions of the element gears have cylindrical pitch surfaces.

20. The differential of claim 19 in which said intermeshing second portions of the element gear pairs include teeth oriented at helix angles that sum to substantially zero degrees.

21. The differential of claim 20 in which said side gear helix angles sum to substantially zero degrees.

* * * * *